United States Patent [19]

Van Ness

[11] 4,085,313
[45] Apr. 18, 1978

[54] AUTOMATIC PRODUCT-DISPENSING SYSTEM

[75] Inventor: Bradford O. Van Ness, Paradise Valley, Ariz.

[73] Assignee: Engineered Systems, Inc., Tempe, Ariz.

[21] Appl. No.: 729,992

[22] Filed: Oct. 6, 1976

[51] Int. Cl.² .................. G06K 17/00; G06K 15/00
[52] U.S. Cl. .................................................. 235/419
[58] Field of Search ............... 235/61.7 B, 61.7 R, 235/61.6 R, 61.1; 340/149 A; 222/2; 194/4 R

[56] References Cited

U.S. PATENT DOCUMENTS

| Re. 28,701 | 1/1976 | Edwards et al. | 235/61.7 B |
|---|---|---|---|
| 3,873,019 | 3/1975 | Holcomb | 235/61.7 B |
| 3,931,497 | 1/1976 | Gentile et al. | 235/61.7 B |

*Primary Examiner*—Daryl W. Cook
*Attorney, Agent, or Firm*—Drummond, Nelson & Ptak

[57] ABSTRACT

An automatic fuel-dispensing system for dispensing fuel at unattended fueling sites includes a number of fuel pumps capable of dispensing different types of fuel. A common control console is used to control the operation of the fuel pumps and to record the data relative to the customer identification, site location and quantity of fuel used. The control console includes a card reader, and a customer inserts a card which uniquely identifies him into the reader, enters an odometer reading, and selects a pushbutton for the fuel pump from which he desires to obtain fuel. If a validity check of the card against preset validity check data fails, a red invalid panel indicator illuminates on the control console; and no product can be withdrawn from the selected dispenser. If the inserted card passes the validity checks, the odometer reading and customer identification data is stored in a RAM memory uniquely associated with the selected dispenser. The card then may be removed from the reader which is then ready for the next fueling operation for another customer, even though fuel in the meantime is being withdrawn from the first-selected dispenser. Upon completion of fueling, the customer hangs up the dispensing hose to turn off the pump, and the control console is signaled to indicate fueling is completed. The customer identification, quantity of product withdrawn, identity of product, and other optional output data then is automatically transferred under control of the control console to a teletypewriter or output interface for further processing. A single card reader and control console may simultaneously control the dispensing of fuel from all of the pumps which are controlled by it, and each of the transaction records are separately transferred to the output teleprinter or interface automatically without interference.

8 Claims, 9 Drawing Figures

4,085,313

AUTOMATIC PRODUCT-DISPENSING SYSTEM

BACKGROUND OF THE INVENTION

Automated fuel-dispensing systems and semi-automated fuel-dispensing systems have been devised to permit unattended or semi-unattended purchases of fuel by authorized customers of such systems. Customers using systems of this type typically include municipalities, large trucking companies, and the like. When only a single customer uses a given facility, control of the fuel-dispensing facility is relatively simple. When the system, however, is required to serve many different customers or a single customer with a large number of drivers and vehicles, it generally is necessary to have an attendant on duty at a central location in the station for billing purposes. Typically, systems of this latter type are the commonly known "self-service" gasoline stations which have a central location manned by an attendant who monitors volume readers and the pump turn-on switch controls for the fuel pumps located at the station. The customers pump their own fuel and then go to the central location to pay for the fuel or otherwise take care of the billing.

Fully automatic self-service fuel-dispensing systems have been developed in which a credit card or specially prepared credit document is inserted into a card reader, with selected data from the card then being transmitted to a remote central computer for verification. If the document is verified as an authorized document, the system then permits the withdrawal of fuel under the control of the credit card. The value of the fuel withdrawn is monitored and, upon completion of the transaction, data representative of this quantity is transmitted by the local controller along with the credit card identification to a central computer for processing on the particular account number indicated by the credit card being used. While a system of this type permits the completely unattended operation of a fuel-dispensing service station for customers having credit cards usable in the system, it requires committed transmission links between the location of the fuel pumps and the central computer location. This results in a relatively expensive system and limits the flexibility which is available at any given fuel-dispensing site.

It is desirable to simplify automatic fuel-dispensing systems operated under control of a credit card or credit document by concentrating verification of the credit card and control of the fuel dispensers from a single local control console for a number of different dispensers, without the necessity of verification of each transaction or a portion of each transaction by a central computer located remotely from the fuel-dispensing site. Further, such an unattended fuel-dispensing site should be capable of producing a complete record of the transaction, including identification of the credit card used to initiate the transaction, as well as the quantity and type of fuel withdrawn, along with other optional data such as time, date, site location, and the like. Such data representative of a transaction then may be stored in a suitable store-and-forward memory or may be transmitted directly, as desired, from a teletypewriter terminal to a central processing computer for ultimate billing purposes for the completed transactions at the fueling site.

SUMMARY OF THE INVENTION

Accordingly, it is an object of this invention to provide an improved automatic product-dispensing system.

It is another object of this invention to provide an improved unattended automatic fuel-dispensing system.

It is an additional object of this invention to provide an improved automatic fuel-dispensing system operated under control of credit documents.

It is a further object of this invention to provide an improved automatic fuel-dispensing system which locally verifies credit documents used to operate the system and which employs a single control console capable of simultaneously handling a number of different transactions.

According to a preferred embodiment of this invention, a document-controlled automatic dispensing system for controlling the dispensing of products from several different dispensers includes a control console which has a document reading device or card reader for reading data from credit documents inserted into it to initiate a transaction in the system. A control logic circuit performs a validity check on the document to verify its validity; and this validity check logic is coupled with the fuel dispensers to enable them for operation to dispense fuel in response to an output indicative of a valid document or credit card inserted into the document reader. A particular dispenser is selected and data identifying the credit card customer is transferred by the document reading means to a first data storage device uniquely associated with the selected dispenser. As fuel is withdrawn from the dispenser, a second data storage device stores data representative of the quantity of product dispensed from the dispenser. Upon the completion of the transaction, a switch is operated to initiate operation of a data transfer circuit, which then controls the transfer of data stored in the first and second storage devices (memories) to a transaction store-and-forward memory or teletypewriter. Various optional features, such as the insertion of odometer readings, time and date of transaction, along with a transaction number and site location identification also may be supplied to the teletypewriter or store-and-forward memory upon the completion of each transaction, when these optional features are included in the system.

DETAILED DESCRIPTION

Figure 1:
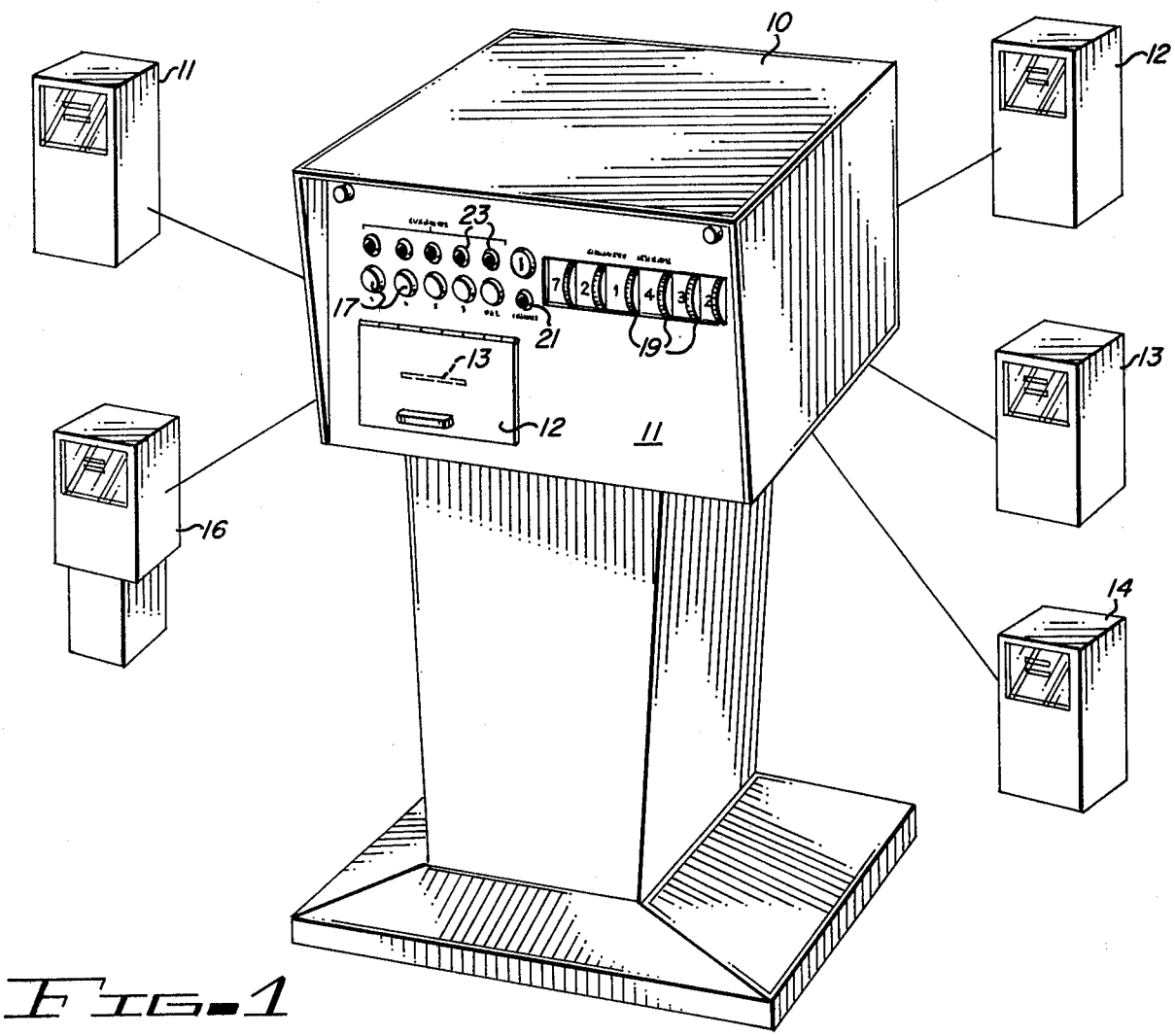
FIG. 1 is a pictorial view of a controller console for controlling the operation of several fuel dispensers and shows the customer-operated controls.

Referring now to FIG. 1, there is shown a typical installation of an automatic fuel-dispensing system, which includes a control console 10 conveniently located in a service island for typically controlling four fuel dispensers 11, 12, 13 and 14 used to dispense gasoline or diesel fuel and a fifth dispenser 16, which typically is used to dispense oil or other products. All of the fuel dispensers 11 to 14 and the dispenser 16 generally are located in a conventionally arranged service island, with the control console 10 conveniently located near the various dispensers.

The control console 10 has a front panel 11 which includes a weather-proof door 12 covering a slot 13 for a credit card or document card reader used in conjunction with the system. To use the system, the customer first opens the door 12 and then inserts his authorization credit card or document card into the slot 13. A card reader is enclosed within the console housing 10 and typically is an all-electronic card reader for reading multi-column, multi-row coded identity cards. Readers of this type are commonly available and are used in conjunction with identity cards having binary-encoded data encoded therein by selectively punching data bit locations in the cards for the different characters or numbers encoded thereon. The particular configuration in which these characters are encoded is described in greater detail subsequently.

When a card is inserted into the slot 13, it trips a switch in the console 10 to initiate operation. The customer then depresses one of five pushbuttons 17 on the panel to select the desired ones of the dispensers 11 to 14 and 16 from which the customer wishes to withdraw fuel or other products. In addition, the front panel 11 of the console 10 also is shown as having a number of thumbwheel switches 19 which are set by the driver to the odometer reading of the vehicle for which he is about to withdraw fuel. This provision of these odometer switches 19 is an option which need not be utilized in all uses of the control console 10; but when the system is used for fueling fleet vehicles of a truck fleet, for example, the information provided by the odometer thumbwheel settings is valuable in monitoring the performance of particular vehicles over prolonged periods of time for use in maintenance programs and the like.

Validity checking circuitry in the terminal 10 performs a verification check of the inserted card; and if the card fails to pass this check, an "invalid card" red indicator lamp 21 on the console is turned on. In addition, the system resets and prevents the operation of any of the fuel dispensers 11 through 14 or 16. If the card passes the validity check, a green light 23 adjacent the selected pushbutton 17 turns on, and fuel then may be withdrawn from the selected dispenser.

The fuel dispensers or pumps 11 through 14 are standard, commercially available fuel pumps which automatically reset when the dispensing hose is replaced or hung up. In addition, these pumps include a flow meter which is responsive to fuel flow and which generates output pulses for each predetermined unit of fuel which flows from the pump. Typically, these output pulses are generated every one-tenth gallon. In addition, the pumps include display windows to indicate the quantity of fuel being withdrawn from them. The oil dispenser 16 also is of a type similar to the fuel dispensers 11 through 14 and has an automatic reset switch operated at the termination of the withdrawal of product from it and further includes a flow meter to measure the quantity of oil or other product withdrawn from it.

Once a green light 23 is turned on for the selected fuel dispenser, the credit or document card may be removed from the slot 13; and the control console 10 then may be used by another driver to withdraw fuel from any one of the unused remaining dispensers. The total time elapsed for the control console 10 to perform its complete validity check, selection of dispenser and a turn-on of either a green light 23 or the invalid indicator lamp 21 is approximately one-tenth second. Thus, as far as the driver is concerned, the operation of the controller 10 following depression of the selected fuel dispenser's pushbutton 17 is substantially instantaneous. The logic circuitry required to effect the control and to record and forward the complete information concerning the transaction is described subsequently in conjunction with the remaining figures of the drawings.

The system includes logic circuitry and signal-generating components for producing a transaction message which is supplied to a teleprinter at the end of the transaction for further processing or which may be forwarded to a store-and-forward memory for subsequent transmission to a central data processing location.

Figure 2:
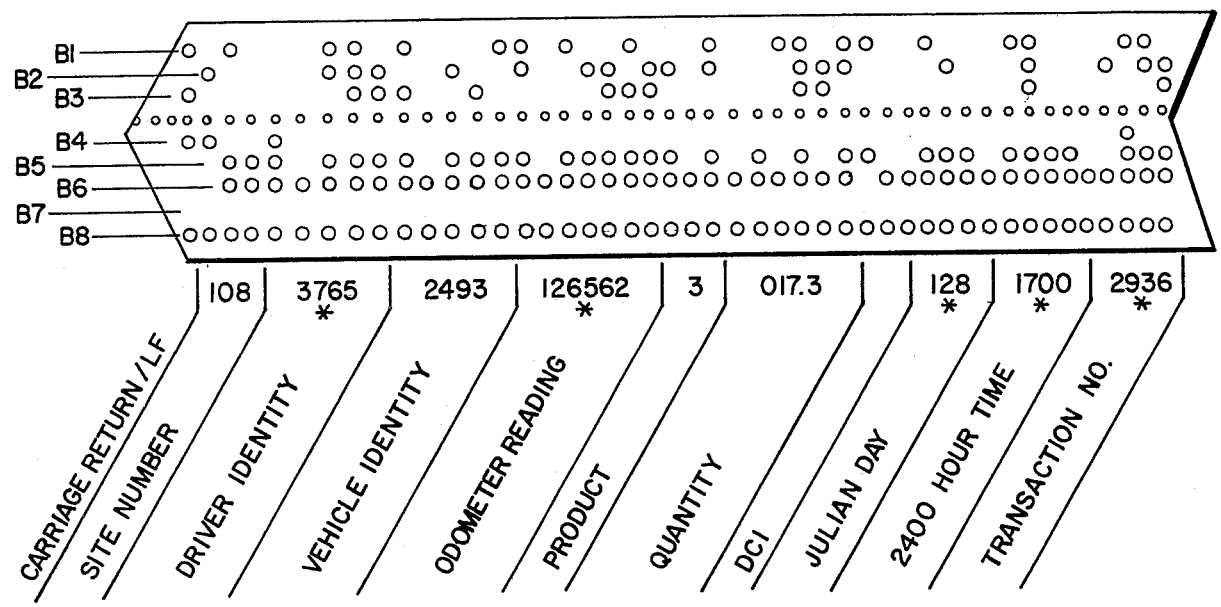
FIG. 2 is a representation of a punched paper tape illustrating a typical fixed-format transaction message of the type generated in the use of the system operated by the controller of FIG. 1.

A typical transaction message format is shown in FIG. 2 which illustrates a conventional perforated paper tape with an eight-bit ASCII encoded message in it (bits 7 and 8 always being encoded binary "0" and "1", respectively). The different bit levels on the tape represented in FIG. 2 are identified with the designations B1 through B8 and these designations are used in conjunction with the subsequent description of the system operation.

The message shown in FIG. 2 is a typical transaction message of the type which is produced in the automatic fueling station in response to authorized fueling transactions initiated by a driver to withdraw various amounts of different types of fuel or other products dispensed by the station under control of the controller 10. Each transaction produces a message format in accordance with the format illustrated in FIG. 2. Each transaction begins with an ASCII encoded carriage return (CR) character followed by a line feed (LF) character. Then a three-digit number identifying the fueling station site is automatically produced in the tape at the fueling station. This is followed by an optional four-digit driver identity code and a four-digit vehicle identity code. Each of these different portions of the message are separated by a space (SP) character; so that when the data is ultimately printed by a teletypewriter or computer printer, the different portions of the message are separated from one another. Following the vehicle identity portion of the message, the remainder of different portions of the transaction, identified as shown in FIG. 2, are entered in the order shown, reading from left to right. Those portions which are identified by an asterisk are optional; but preferably all portions of the message are included for maximum information content with respect to the transaction. If the tape which is produced at the fueling station is transmitted directly to a teletypewriter terminal, the printout of the message is as shown directly below the representation of the tape in FIG. 2. This message format is followed throughout the system of remote fueling stations of which the particular fueling site described herein is a part, and data ultimately is collected from all stations in the system at some central location for further processing and accounting purposes.

Figure 3:
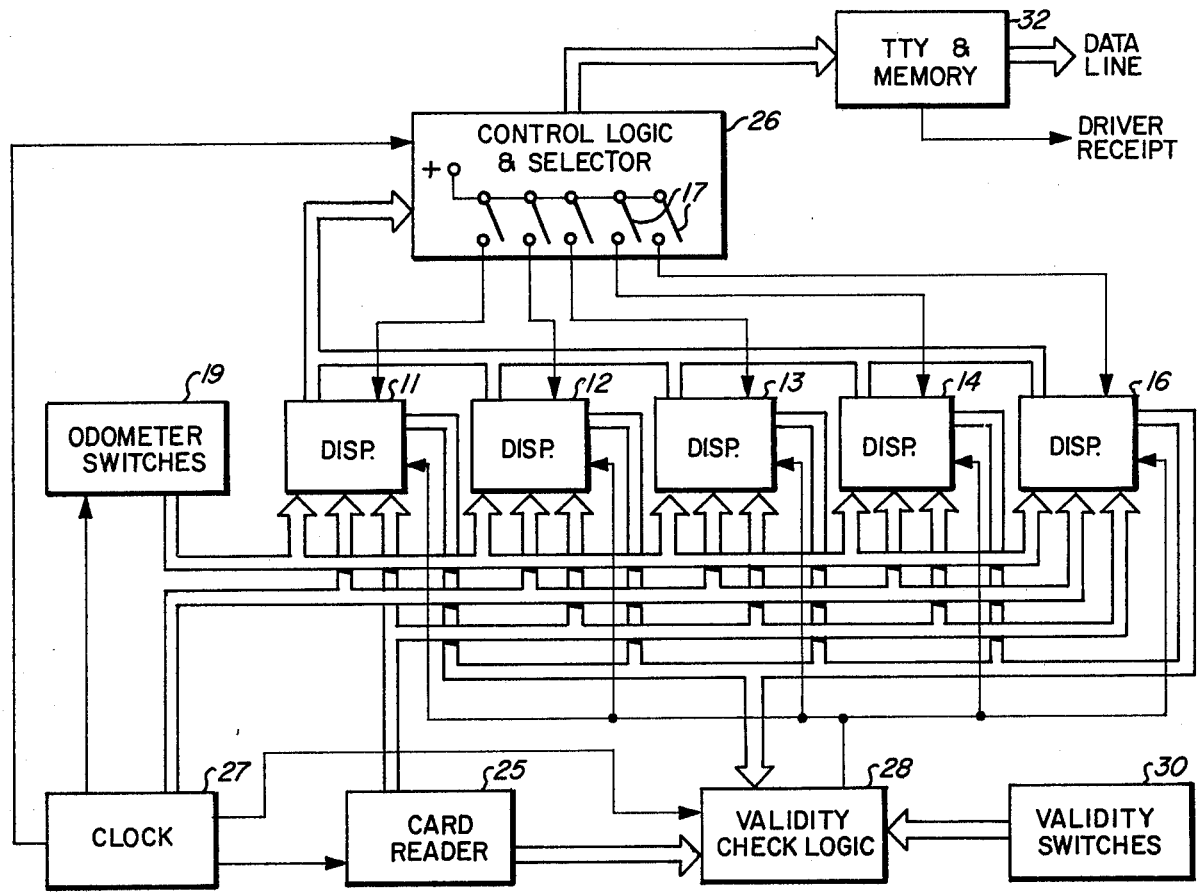
FIG. 3 is a block diagram of a preferred embodiment of the system.

Reference now should be made to FIG. 3, which is a block diagram of the system logic employed in the controller 10 and in conjunction with the fuel and product dispensers 11 through 14 and 16. When a driver wishes to use the fueling facility to withdraw fuel from any one of the dispensers, he first proceeds to an unused dispenser containing the desired fuel. He then inserts his credit/identification card into a card reader 25 in the manner described previously in conjunction with FIG. 1. If the optional odometer entry is included, he operates the odometer switches 19 to dial in his odometer reading prior to dispenser selection. Dispenser selection is accomplished by closing one of the switches 17 in the control logic and selector circuit 26 which provides an operating signal to the selected one of the dispensers 11 through 14 or 16.

A clock timing pulse generator circuit 27 is employed to synchronize the operation of the entire system and produces sequences of clock pulses which operate the various components of the system illustrated in FIG. 3. These clock pulses operate the card reader 25 and a validity check logic circuit 28 for comparing validity or security data on the card against security data established by the settings of validity switches 30 located within the console 10 and inaccessible to the driver. In addition, the card inserted into the reader 25 also has encoded on it the particular type of fuel or fuels which the driver using the card is authorized to obtain. This encoded information is compared with data from the selected dispenser (or a logic circuit for that dispenser) and supplied to the logic circuit 28 for a further validity check.

If the inserted card passes all of the security and validity checks, the indicator light 23 associated with the selected dispenser pushbutton 17 illuminates to indicate that the selected dispenser is enabled for fueling. The card then is removed from the reader and the card reader 25 is ready for use with another card to start a new transaction which may take place simultaneously with the dispensing of fuel from the dispenser selected by the first card. The dispenser select indicators 23 remain illuminated so long as the dispenser is in use, so that subsequent users of the control console 10 may readily determine which dispensers are free for simultaneous use.

If for some reason, the validity check of a card inserted into the reader 25 does not check out, the invalid indicator light 21 is illuminated on the control panel; and no product can be withdrawn from the selected dispenser since it is not turned on by the system.

During the time the validity check is being made, data from the card, representative of the driver and vehicle identity, and the odometer reading, if this option is employed, is supplied to a temporary buffer storage associated with the selected dispenser for storage therein, so that this information subsequently may be used to form the transaction message of FIG. 2 without holding the card in the card reader 25 until after completion of the transaction. As fuel is withdrawn from the selected dispenser, a count of the quantity of fuel is also generated under control of the flow meter in the dispenser. Upon completion of fueling, the driver hangs up the hose or otherwise turns off the dispenser, and this signals the system that the fueling transaction is completed. Loading is immediately terminated and the system de-energizes the selected dispenser. This is followed by the automatic generation of the transaction message shown in FIG. 2 with the various data of that message being sequentially generated under control of the clock circuit 27 from fixed and RAM memories and counters located in the control logic circuit 26 and in the logic circuit for the selected dispenser from which the product was withdrawn.

It should be noted that in the block diagram of the system in FIG. 3, the logic for entering, holding and, finally, outputting data for the various dispensers 11 through 14 and 16 is illustrated as located at the block for each of these dispensers. This, however, is not necessary in the actual implementation of the system since this logic all could be included within the console 10 of the control unit. Then the only interconnections between the control console 10 and the various dispensers are those required to turn on the dispenser and to receive the flow meter pulses and hose "hang-up" information from the selected dispenser. It is believed, however, that the logic grouping shown in FIG. 3 facilitates an understanding of the system even though it does not necessarily represent the actual physical locations of the electronic logic control components utilized in the system.

Figure 4:
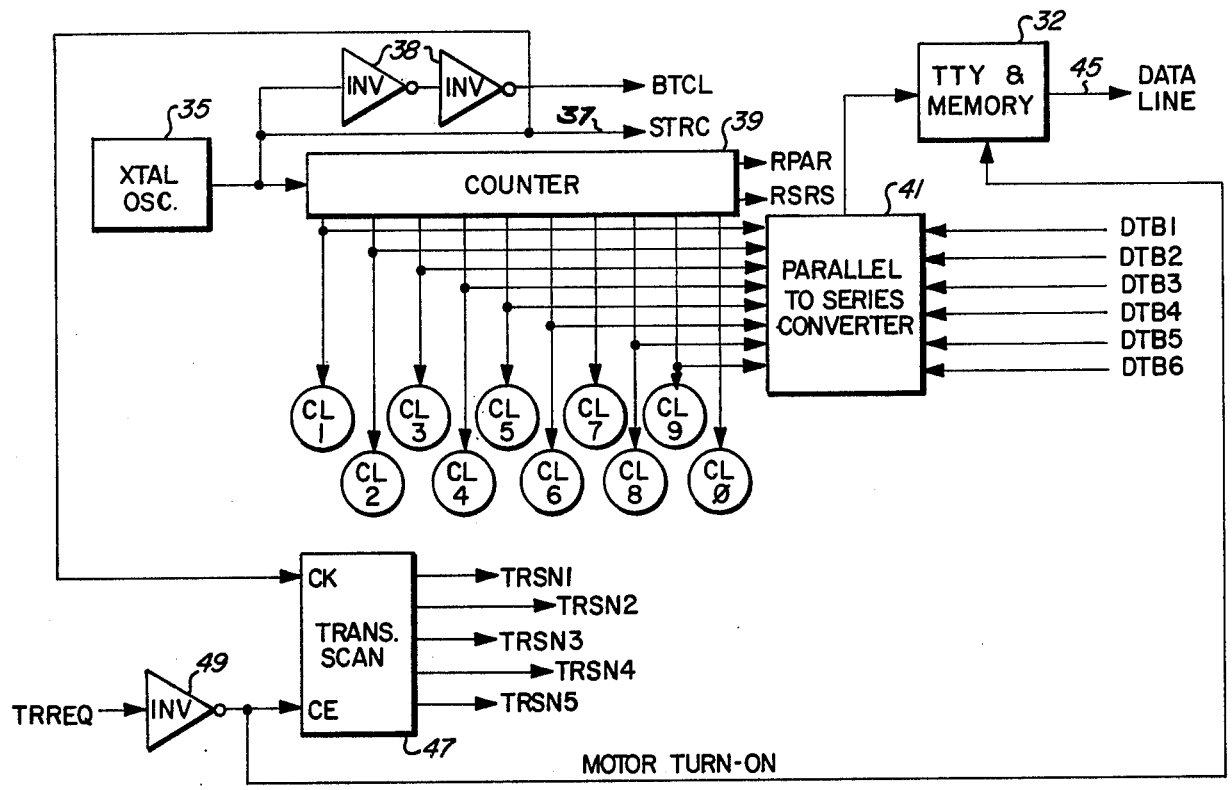
FIG. 4 is a more detailed block diagram of a portion of the system shown in FIG. 3.

FIG. 4 shows a more detailed circuit diagram of the clock generator circuit for producing the various timing or clock pulses used in the system, along with the interface between this circuit and the output circuit used to forward the transaction data to the output teletypewriter and memory circuit 32, once a transaction has been completed. The basis for all of the timing for the entire system shown in FIG. 3 and described in more detail in subsequent FIGS. 5 through 9 is a stable, free-running crystal oscillator 35. The clock pulses from the output of the oscillator 35 are at the bit rate and are applied over a first lead 37 as strobe clock pulses (STRC) and are slightly delayed by a delay circuit 38 to produce the bit clock timing pulses (BTCL). The mnemonic designations "STRC" and "BTCL" and other mnemonic designations are used throughout the several figures to identify the interconnections and signals appearing at various points in the figures. The same mnemonic designations are used throughout the figures to aid in an understanding of the interconnections, both physically and functionally, of the various parts of the system logic.

The clock pulses at the bit rate are applied to a counter 39 to produce output pulses at the bit rate on 10 different output leads (CL1 through CL0) sequentially and continuously. These outputs from the counter 39, along with the pulses on the lead 37 and available at the output of the delay circuit 38 constitute the timing pulses for the system and synchronize the operation of all the various parts as will be more fully understood hereinafter.

The outputs from the counter 39 also are supplied to a parallel-to-series converter circuit 41, with the exception of outputs CL7 and CL0. The other inputs to the converter circuit 41 are parallel-encoded data bits from other portions of the system for the first six data bits of the ASCII information supplied from the converter 41. The circuit 41 is a conventional circuit for changing the parallel-encoded data to serial-encoded data; and the converter 41 also adds the constant B7 binary "0" and B8 binary "1" bits illustrated in FIG. 2. The output of the converter circuit 41 is supplied to a suitable teleprinter and store-and-forward memory circuit 32, the output of which is supplied over a data line 45 to a central data processing computer or for local processing, depending upon the particular system network with which the automatic fueling system station is used.

The STRC pulses also are applied to a transaction scanning circuit 47 which continuously scans the transaction logic of the dispensers 11 through 14 and 16 for an indication that a transaction has been completed at one of the fuel or product dispensers. The transaction scanner 47 comprises a ring-type circuit which sequentially produces an enabling output on five output terminals TRSN1 to TRSN5. Whenever a transaction completion request is found at any of the logic circuitry for any of the dispensers 11 through 14 and 16, a transaction request, TRREQ signal, is applied to an inverter 49 to terminate the operation of the transaction scanner 47 and to turn on the motor of the teletypewriter in the circuit 32. This is described in greater detail subsequently.

Figure 5:
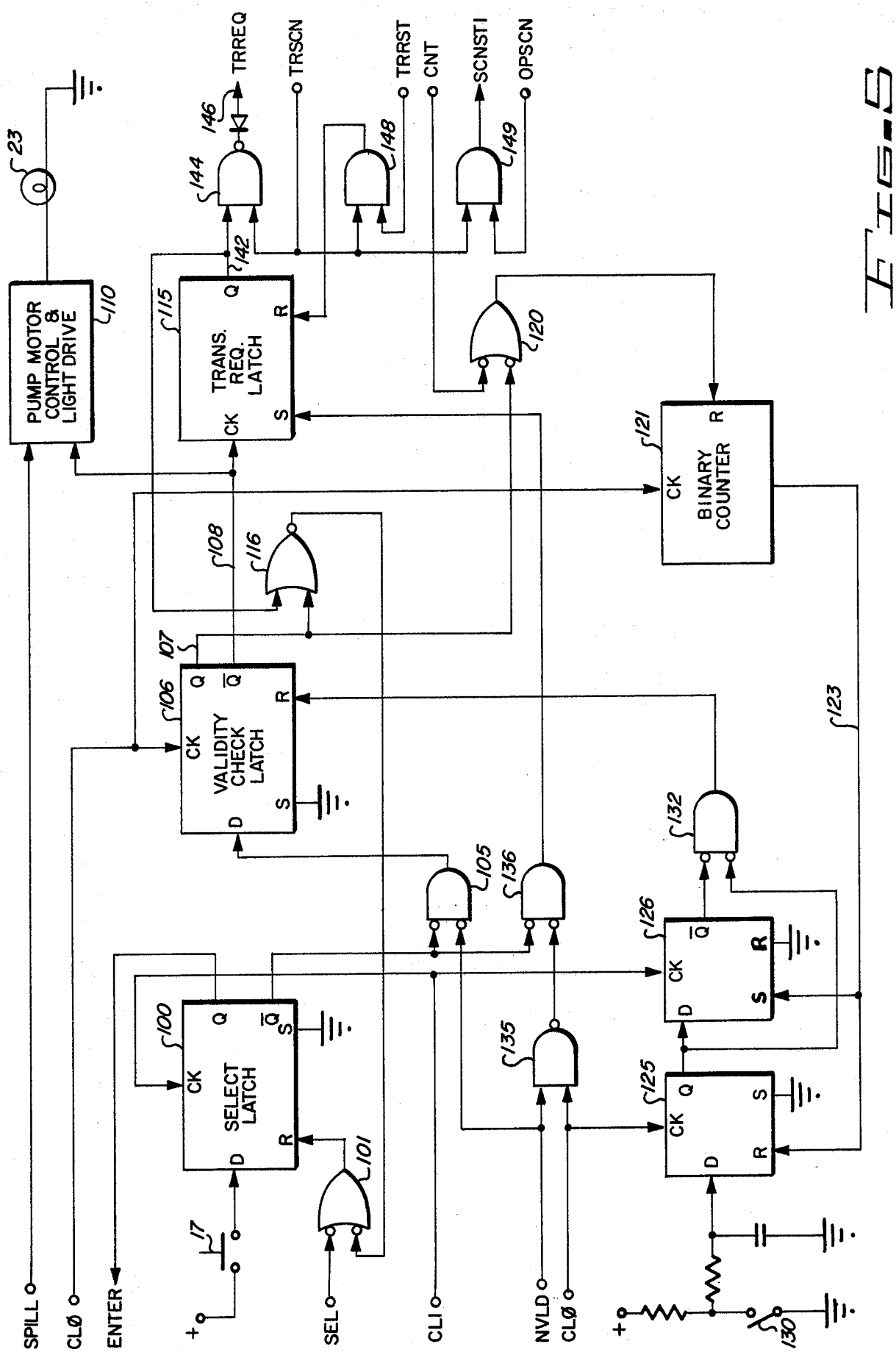
FIGS. 5 through 9 are detailed block diagrams of a preferred embodiment of a circuit used to implement the operation of the system shown in FIG. 3.
Figure 6:
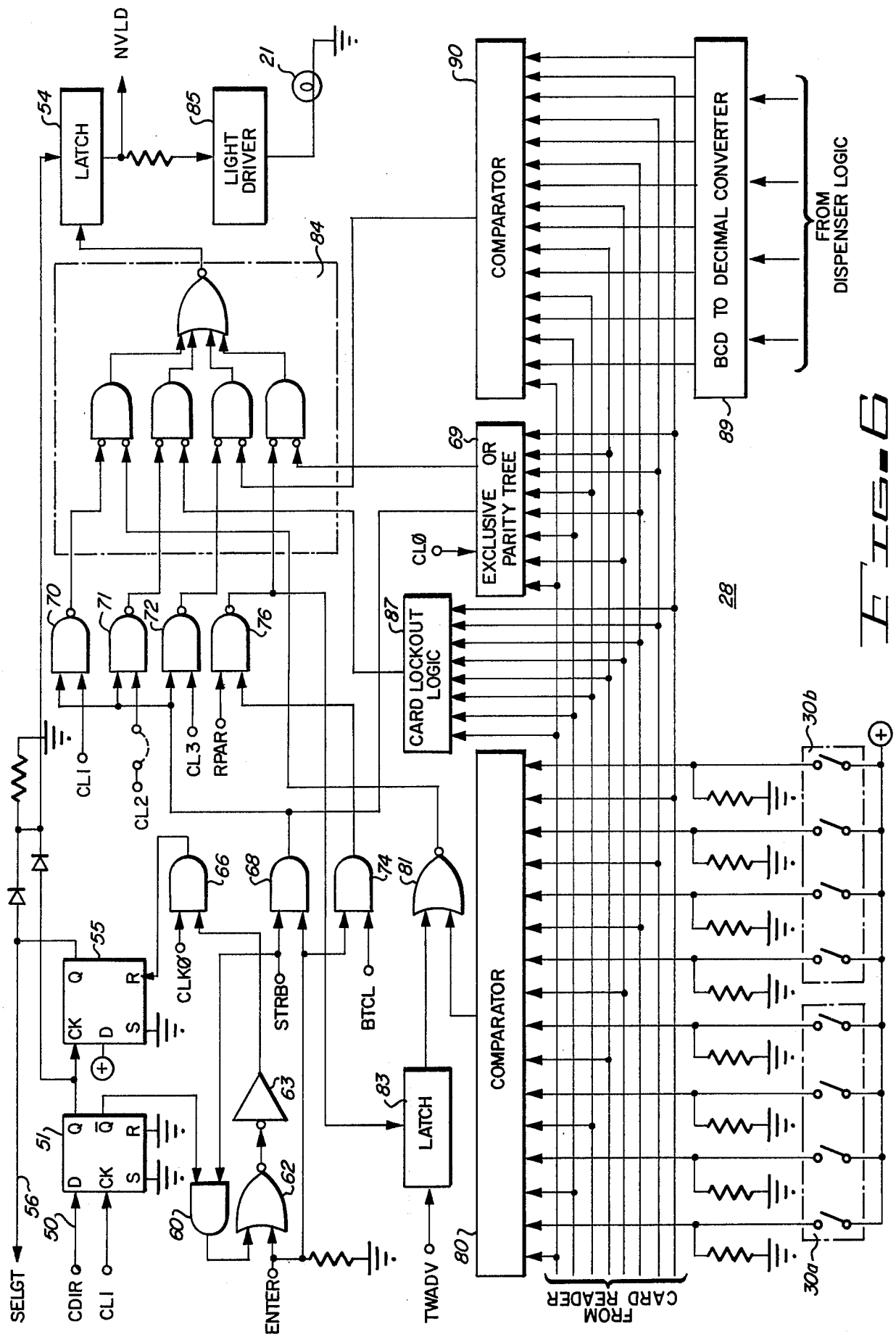

The remainder of the figures comprise a block diagram of the system, and reference first should be made to FIGS. 5 and 6. When a credit card is first inserted into the card reader 25 (FIG. 3), it closes a switch (not shown) to apply an enabling potential CDIR over a lead 50 to the D enabling input of a flip-flop 51 forming part of a card reader synchronizing circuit (FIG. 6). Following this operation, the next clock pulse which appears on output CL1 of the counter 39 sets the flip-flop 51 to provide a high output potential on its Q output and a low output potential on its $\overline{Q}$ output. This is applied as a positive enabling signal to a latch circuit 54 and also is applied as a clock signal to a second flip-flop 55 to set it to provide a high output potential on its Q output. When the output of the flip-flop 55 goes high, a dispenser select reset pulse SEL is applied over a lead 56 to all of the product dispenser control boards to reset those boards which are not presently in the process of controlling the dispensing of fuel from a dispenser. All dispensers which are not in use at the time the pulse on the lead 56 occurs are reset by this pulse.

When the $\overline{Q}$ output of the flip-flop 55 goes low, the output of an AND gate 60 also is forced to go low to cause the output of a NOR gate 62 to initially go high since the other input (ENTER) to the NOR gate 62 is obtained from a select latch flip-flop 100 (FIG. 5) for whichever one of the fuel or product dispensers 11 through 14 or 16 is subsequently selected by the depression of the corresponding pushbutton 17 on the panel of the control console by the driver/customer who inserted the card. This positive output signal from the NOR gate 62 is inverted by an inverter 63 to disable an AND gate 66 until a dispenser is selected by the depression of the appropriate pushbutton 17. When this occurs, the circuit of FIG. 5, one of which is uniquely associated with each one of the dispensers 11 through 14 and 16, commences operation.

During the time that the pushbutton 17 is closed, the D enabling input for the flip-flop 100 is provided with a positive enabling signal. The next clock pulse CL1 which occurs during the time that the pushbutton 17 is closed, sets the flip-flop 100 to produce a high output potential on its Q output. This high output constitutes the ENTER signal which is the second input to the NOR gate 62 of FIG. 6. When this output goes high, the output of the NOR gate 62 goes low, producing a high enabling output from the inverter 63. The next time that a clock pulse at time CL0 occurs, the output of the AND gate 66 then resets the flip-flop 55, preparing it for subsequent operation by the insertion of another card. It should be noted, however, with reference to FIG. 5, that the SEL output produced on the lead 56 prior to the time the flip-flop 55 is reset is passed through a gate 101 to reset the select latch flip-flop 100. This occurred as soon as a card was inserted into the reader and prior to the depression of the pushbutton 17.

Once the select latch flip-flop 100 is set to indicate selection of the particular dispenser with which it is associated, the high output on the ENTER lead enables an AND gate 68 in the synchronization logic to pass subsequent strobe pulses STRC to an Exclusive OR gate parity tree circuit 69 which previously has been reset by the immediately preceding clock pulse CL0. These strobe pulses passed by the gate 68 also are applied to one of the two inputs of each of three positive logic NAND gates 70, 71 and 72 in the validity check logic circuit shown in FIG. 6.

Similarly, an AND gate 74 is enabled by the ENTER input and the gate 74 passes the bit clock pulses BTCL to one of the two inputs of a NAND gate 76 so long as the ENTER input remains. The other inputs to the gates 70, 71, 72 and 76 comprise the clock outputs of the counter 39 (FIG. 4) CL1, CL2, CL3 and RPAR, respectively. The first three of these clock outputs have been described previously. The RPAR clock circuit output, however, remains high, enabling the gate 76 throughout the complete cycle of operation of the counter 39 so that each time a bit clock pulse is passed by the gate 74, the gate 76 produces an output pulse to sample the output of the exclusive OR parity tree circuit 69 as each column of data on the inserted card is read by the system.

The data encoded on the card is in the form of eight columns of data arranged in eight rows so that each column includes two four-bit binary encoded characters in each row. The card reader 25 is operated in response to the bit clock (BTCL) pulses from the clock circuit to cause each of the eight columns to be sequentially read in synchronism with the clock pulses CL1 through CL8, respectively. The first column encoded on the credit card includes two validity check characters which authorize the use of the particular card at the fueling site with which it is being used. The fueling site is encoded with a preset two-digit code by the setting of two sets of four switches 30a and 30b, each of which is set for a particular four-bit binary encoded digit. These preset digits are compared with the corresponding four-bit binary encoded digits located on the first column of the credit card. The comparator 80 which may be of any suitable type, performs this function and produces an output only if this validity comparison for the site location fails. This output is supplied as one of two inputs to a NOR gate 81, the other input to which is provided from a latch circuit 83.

The latch circuit 83 produces an output in response to the outputs of the gate 76 only if none of the odometer thumbwheel advance switches 19 (FIG. 1) has been reset to place a new odometer reading into the system when a new credit card is inserted into the reader 25 to begin a new transaction. This output change of the thumbwheel advance switches is provided on the input TWADV to the latch circuit 83.

If there is either an output from the latch circuit 83, indicating no change in the odometer reading, or an output from the comparator 80, indicating an invalid site identity for the credit card being used, the gate 81 produces an output which is supplied to an invalid data detection gate circuit 84. The output of the gate 81 is sampled in the circuit 84 at the time of occurrence of the clock pulse CL1 supplied to the gate 70. If there is coincidence between the outputs of the gates 70 and 81, a latching output is obtained from the circuit 84 to operate the previously enabled latch circuit 54. This, in turn, produces a non-valid output NVLD and operates a light driver circuit 85 to illuminate the red non-valid lamp 21 on the control panel.

When the second clock pulse CL2 is obtained from the clock circuit, it may be applied to a coincidence gate 71 provided a credit cart lockout option circuit is employed with the system. If the lockout circuit is employed, the clock pulse CL2 is interconnected to the lower input of the gate 71 to cause operation of that gate. If the card lockout logic 87 is not used, the dotted-line connections shown for the lower input of the gate 71 are left open and it remains inoperative. As shown in FIG. 6, however, this option is illustrated and at the time the second column of data is read from the card inserted into the reader, the clock lockout logic circuit 87 makes the appropriate comparison. If the card is an invalid card, the circuit 87 produces an output to the gate 84 which, in turn, will result in operation of the latch circuit 54, as described above, at clock interval CL2.

As each column of data is read from the card inserted into the reader, this data is supplied to an exclusive OR parity tree which compares the parity of the encoded data on the card in four groups of two bits. Typically, each of the selected two-bit groups are encoded for even parity, and the bit clock output of the gate 74 is applied to the gate 76 to produce pulses for comparison with the output of the parity tree circuit 69 in the gate circuit 84 for each column of data. At any time there is a failure of parity, the latching output for latch circuit 54 is obtained from the gating circuit 84 to produce the non-valid NVLD output. This parity check is made for each of the eight columns of data on the credit card used with the system.

A fourth validity check of the data on the credit card is a product type check which is made at clock interval CL3. Each credit card may be uniquely encoded with the coding for the type of fuel which the card is authorized to withdraw. For example, if the card is issued to the driver of a truck having a diesel engine, the product type encoding on the card precludes the driver from using the card to withdraw gasoline from an automated fueling station. This, in addition to the other security checks described above, helps to prevent unauthorized use of the card by a driver in an attempt to obtain fuel from a fueling site for use in his own personal automobile or the like.

When a particular dispenser is selected by depression of the pushbutton switch 17 (as shown in FIG. 5), the logic circuitry associated with that dispenser is enabled and supplies a four-bit binary encoded digit representative of the type of fuel dispensed from that dispenser. This four-bit binary signal is decoded in a BCD-to-decimal converter circuit 89 to produce a unique output or combination of outputs for comparison in a comparator circuit 90 with the data read in the third column of the card inserted into the card reader 25. As can be seen from an examination of the gate interconnections at the gate 84 and the output of the gate 72, when the clock pulse CL3 occurs, an output is obtained from the gate 72 to read the output of the comparator 90. An output is present from the comparator 90 only upon failure of the product type encoding in column three of the credit card to correspond to the product type designation supplied to the circuit of FIG. 6 from the selected dispenser. Once again, if there is a failure to have a matching of the product type which the credit card is authorized to withdraw with that from the selected dispenser, the latch circuit 54 is operated and the non-valid NVLD output is obtained. As stated previously, this lights the red light 21 on the control console, so the person using the card knows that the system has not been enabled to permit him to withdraw any fuel.

Normally, the validity check circuit 28 does not operate the latch 54, and the system proceeds to permit the withdrawal of fuel or other products from the selected dispenser. The circuit of FIG. 5 shows the logic circuitry for effecting the turn-on control of the selected dispenser. Each of the dispensers 11 through 14 and 16 has its own control circuit such as that shown in FIG. 5, with the ENTER outputs all connected in parallel with one another. A different switch 17 uniquely associated with each of the circuits of FIG. 5 commences the operation of the particular turn-on latching circuit for the selected dispenser. The manner in which the selected dispenser latch 100 is first turned on is described above. When this occurs, the $\overline{Q}$ output goes low, enabling a NAND gate 105, the other input to which comprises the NVLD output of the latch circuit 54 (FIG. 6). Normally this output remains low so that the output of the NAND gate 105 goes high to enable a validity check latch flip-flop 106 to respond to the clock zero pulse CL0 at the end of the clock pulse sequence from the sequence of operation of the counter 39 (FIG. 4).

At the time the clock pulse CL0 occurs, all of the data on the credit card inserted into the card reader 25 has been read. If this data is valid, with no output from the latch 54, the CL0 clock pulse applied to the latch circuit 106 sets it to cause a high output potential to appear on its Q output lead 107 and a low output potential to appear on its $\overline{Q}$ output lead 108. This low output is applied to a pump motor control and light driver circuit 110 to turn on the pump motor in the fuel dispenser and to also turn on the green light 23 on the control panel 11 of the controller 10 associated with the selected pushbutton 17.

When the output signal on the lead 108 goes low, it also prepares the clock input of a transaction request latching circuit 115 for operation at the time that the output on the lead 108 once again goes high. At this time, however, the output of the transaction request latch circuit 115 is a low output which is supplied along with the high output now appearing on the lead 107 to a NOR gate 116. This causes the output of the NOR gate 116 to go low, which in turn forces the output of the negative logic NOR gate 101 to go high to reset the select latch flip-flop 100 to its initial condition of operation. The validity check latch flip-flop 106, however, is unaffected by this change; and this operation merely readies the select latch flip-flop 100 for operation the next time the dispenser with which the circuit of FIG. 5 is associated is again selected. At the same time, the Q output of the select latch flip-flop 100 goes low so that the ENTER input to the gate 62 (FIG. 6) now is able to respond to the entry of data from some other dispenser circuitry, even though the dispenser associated with the particular circuit under discussion in conjunction with FIG. 5 is currently enabled for the dispensing of product.

With the circuit in this condition of operation, fuel may be withdrawn from the dispenser under control of the pump motor in the circuit 110. As stated previously, the pump is the type that includes a flow meter which produces counting pulses CNT on one of two inputs to a negative logic NOR gate 120. The NOR gate 120 is enabled by the high enabling signal appearing on the lead 107 to produce an output pulse each time a CNT pulse appears on its other input. These pulses are used to continuously reset a binary counter 121 which is advanced in count approximately every one-tenth second upon the application of each clock pulse CL0 to the system.

If no fuel is being withdrawn from the enabled dispensing system, the binary counter 121 is not reset, and the CL0 clock pulses continue to advance its count until a predetermined count is reached to produce an output pulse on an output lead 123. This pulse is applied to the direct reset terminal of a flip-flop 125 and to the direct set terminal of a flip-flop 126 which are interconnected together to form a trailing-edge pulse detector. Normally, the flip-flop 125 is set to produce a high signal on its output upon the occurrence of the first CL0 pulse following the opening of a hose hang-up switch (load complete switch) 130. The switch 130 is of the type normally found on computer-type fuel dispensers and is opened whenever the hose is removed to initiate the dispensing of fuel from the pump. As is apparent from FIG. 5, when the switch 130 is opened, the D enabling input of the flip-flop 25 goes high and the very next CL0 pulse applied to it sets it to its high output state. Normally, the flip-flop 125 remains in this state throughout the fueling operation, which in turn enables the flip-flop 126 to be set to its reset condition by the next-following clock pulse CL1. This means that both of the inputs supplied to a negative logic NAND gate 132 are high so that its output remains low throughout the time fuel is being withdrawn.

If for any reason fuel is not dispensed from the enabled dispenser within the time period of the binary counter 121, both of the flip-flops 125 and 126 are supplied with the pulse on the lead 123 and this causes both inputs to the negative logic NAND gate 132 to go low. This, in turn, produces a high output pulse applied to the reset input of the validity check latch 106, resetting it to produce a low output on the output lead 107 and a high output on the lead 108. A similar result so far as the resetting of the latch 106 is concerned occurs when a normal transaction is completed and the pump switch 130 is closed by hanging up the hose on the pump dispenser or in some other conventional manner. This also results in the application of two low inputs to the negative logic NAND gate 132, causing its output to go high to reset the validity check latch circuit 106.

The control of the transaction request latch circuit 115 then is effected by the positive-going pulse transition appearing on the lead 108 when the latch 106 is reset. The transaction request latch is continuously enabled by a positive potential applied to its D input terminal 140 and is set from a normally reset condition to produce a high output on its output lead 142. This high output comprises one of two inputs to a positive logic NAND gate 144, the other input to which constitutes the corresponding one of the transaction scan inputs TRSN1 through TRSN5 corresponding to the particular dispenser with which the circuit of FIG. 5 is associated. Each different dispenser has a different one of the five TRSN inputs applied to it; so that the dispensers are uniquely scanned one at a time in sequence by the operation of the transaction scan circuit 47 (FIG. 4). If the transaction request latch circuit 115 has been operated, the next TRSN input pulse applied to the gate 144 causes it to produce a transaction request output TRREQ on an output terminal 146. As stated previously, this output is applied to the inverter 49 to stop operation of the transaction scan circuit 47 until such time as the complete transaction has been supplied to the teletypewriter and memory circuit 32 by the system.

Since the operation of the transaction scan circuit 47 has been stopped at a time when the particular TRSN output from it for the dispenser which stopped the scan is high, an additional pair of positive logic AND gates 148 and 149 are enabled for subsequent operation in response to pulses applied to their inputs. The gate 148 is used to reset the transaction request latch, which then completes the resetting of the circuitry shown in FIG. 5 to enable it to respond to a new transaction request for the dispenser which it controls. The gate 149 is used in conjunction with other logic circuitry to control the sequence at which the transaction information is supplied to the parallel-to-serial converter circuit 41 (FIG. 4) from which it is supplied to the teletypewriter and memory circuit 32. The timing sequence at which the outputs of the gates 148 and 149 are obtained is described in conjunction with the circuitry shown in FIGS. 7, 8 and 9 to which reference now should be made.

Figure 7:
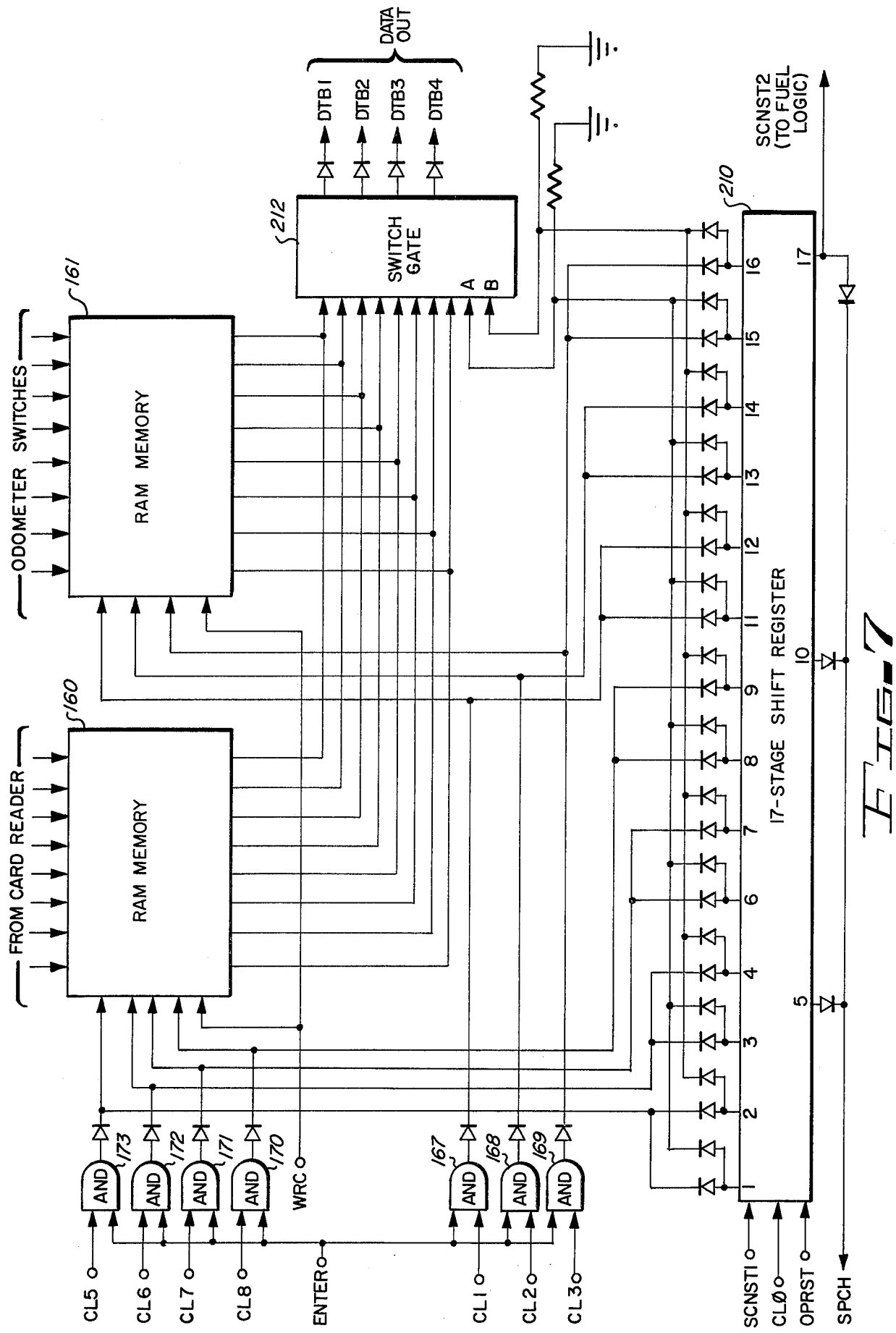

Next consider the circuitry of FIG. 7. A circuit of the type shown in FIG. 7 is used for each of the dispensers 11 through 14 and 16 and is uniquely associated with the control circuitry of FIG. 5 for that particular dispenser. At the time the credit card is still inserted in the card reader 25, the reader continuously supplies the rows of information from the columns of the card to a RAM read-write memory 160. A similar RAM read-write memory 161 is provided with the outputs of the odometer switches 19, and the inputs to both of these memories comprise eight rows of parallel inputs, each consisting of two four-bit binary encoded digital numbers.

When the select latch circuit 100 (FIG. 5) for the selected dispenser produces a high ENTER output, this output enables an AND gate 165 (FIG. 8), also uniquely associated with the logic circuitry for the selected dispenser, to pass the next-occurring strobe pulse STRC to its output to produce a write-read control RWC pulse which is supplied to the RAM memories 160 and 161 to place those memories in the write condition. As stated previously, the select latch 100 remains in a condition producing a high ENTER output for one complete cycle of operation of the counter 39. This enables eight positive-logic AND gates 167 through 173, respectively, to respond to the clock pulses CL1 through CL8 as they sequentially occur from the outputs of the counter 39.

The first three of these clock pulses are passed by the gates 167 through 169, respectively, to the first three rows of the RAM memory 161 and cause the storage of the six digits of information (two per row) from the odometer switches applied to the RAM memory 161 to occur. It should be noted that this happens simultaneously with the validity check of the card by the validity check circuit 28 which has been described previously.

At the time clock pulse CL4 occurs, it is passed by an AND gate 175 (FIG. 8) to operate an eight-bit latch circuit 176 to store the two digits of information encoded in column 4 of the card. These two digits are representative of the maximum quantity of fuel which the holder of that card is authorized to withdraw from the system. The information stored in the latch circuit 176 then is supplied to a comparator circuit 178, the operation of which is described subsequently.

The "write" signal which precedes each of the clock pulses from the counter 39 so long as the ENTER signal is present causes the storage in the RAM memory 160 of the next four columns of information from the card in the four corresponding rows of the memory 160 in response to the respective clock pulses CL5 through CL8. This data also is stored two digits per row and comprises the driver and vehicle identity information.

When the latch circuit 100 (FIG. 5) is reset at the end of a sequence of operation of the counter 39, as described previously, the ENTER enabling system no longer is present and the AND gates 165 and 167 through 173 are disabled. As a consequence, the RAM memories 160 and 161 no longer respond to subsequent clock pulses applied to these gates. In addition, both memories are placed in their "read" mode of operation. They remain in this status during the time that fuel is withdrawn from the selected dispenser.

Figure 8:
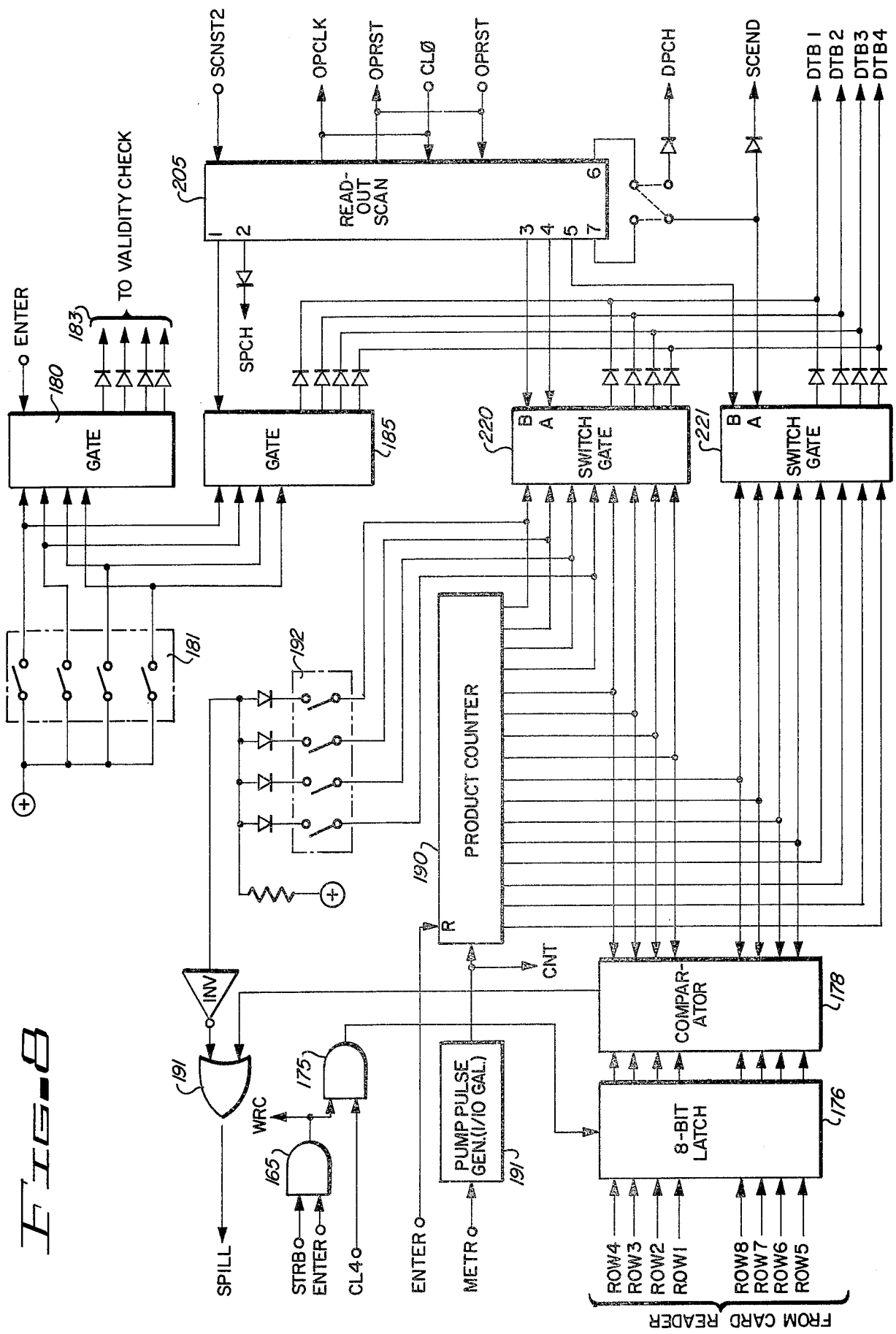

For the consideration of the operation of the system as fuel is withdrawn from the dispenser, reference now should be made to FIG. 8. During the time that the ENTER signal is present, a transmission gate 180 is enabled to pass a four-bit binary encoded digit established by the settings of four switches in a circuit 181 which are encoded to designate the type of fuel which the dispenser is providing. When the gate 180 is enabled, the settings of these switches are applied through four output leads 183 to the validity check circuit of FIG. 6 to the four inputs of the converter circuit 89. The operation of the converter circuit in checking the fuel type authorization as read from the card reader already has been described. Once the ENTER signal ceases to exist, as described above, the gate 180 is disabled for the duration of the transaction which is under way. The settings from the switches 181, however, also are applied to a second gate circuit 185 which is used subsequently to supply the fuel-type identity to the transaction output circuitry as part of the transaction record described previously in conjunction with FIG. 2.

Once all of the operations which have been described above have taken place, the driver/customer may withdraw fuel from the selected fuel pump dispenser. The ENTER signal previously reset a fuel product counter 190 to a zero count, and the flow meter on the fuel pump produces a sequence of pulses through a pump pulse generator, generally one pulse for every one-tenth gallon of fuel withdrawn. These pulses then are applied to the product counter 190 to advance its count in a normal manner to provide a running accumulation count representative of the quantity of fuel being withdrawn. The pulses from the circuit 191 also comprise the CNT pulses which are applied to the gate 120 (FIG. 5).

Under normal circumstances, the product counter continues to operate until the withdrawal of fuel is completed. At this point, the driver hangs up the hose, thereby closing the switch 130 (FIG. 5). As stated previously, this initiates operation of the transaction request latch circuit 115 and causes a transaction request output (TRREQ) to be obtained from the gate 144 on the terminal 146.

In the event that the product counter 190 reaches a count which is in excess of the authorized quantity of fuel which may be drawn in response to the credit card initiating the transaction, the comparator 178 produces an output when the fuel quantity from the counter 190 is the same as the maximum authorized fuel quantity applied to the other inputs of the comparator 178 from the latch circuit 176. When this occurs, the comparator output is passed through a positive logic OR gate 191 to produce a SPILL output signal. This output is applied to the pump motor control circuit 110 (FIG. 5) to turn off the pump motor. The circuitry of FIG. 5 then functions in a manner similar to that previously described when no fuel is being withdrawn to ultimately reach a count in the binary counter 121 to produce an output pulse on the lead 123. As described previously, this then sets the transaction latch circuit 115 and initiates a transaction request signal TRREQ. The operation is the same as if the hose hang-up switch 130 had been closed.

The OR gate 191 also is used in conjunction with a bank of switches 192 to effect the production of a SPILL output in the event that a malfunction should occur in the pump, causing it to continuously dispense fuel for any reason. The switches 192 are selectively closed (only one at a time) to cause the production of a SPILL output in response to the attainment of a high count by the product counter 190 corresponding to this maximum quantity of fuel which can be withdrawn from the system, irrespective of any setting of the latch circuit 176. Normally, the switches 192 are associated with large quantities of fuel, for example, 100, 200, 300 and 400 gallons, respectively.

The TRREQ signal is applied to the D enabling input of a transaction start counting circuit (FIG. 9) comprised of three interconnected flip-flop circuits 193, 194 and 195. These flip-flops are employed along with an abort timer circuit 196 and two additional flip-flops 198 and 199 which, together, control the timing of the generation of the transaction message which is supplied from the system at the end of the transaction. The clock pulses for operating the flip-flops 193 through 195, the circuit 196 and the flip-flops 198 and 199 are the CL0 clock pulses. The flip-flops 193, 194 and 195 initially are in their reset state of operation with their Q outputs low and their $\overline{Q}$ outputs high. The previous time the flip-flop 194 was reset, a positive-going pulse from its $\overline{Q}$ output was applied to the reset input of a shift register 203 in the header scanner portion of the transaction message generator and, in addition, was applied over the OPRST output terminal to the reset inputs of a readout scan counter 205 (FIG. 8) used to produce the information relative to type of fuel and quantity of fuel which was dispensed during the transaction.

Figure 9:
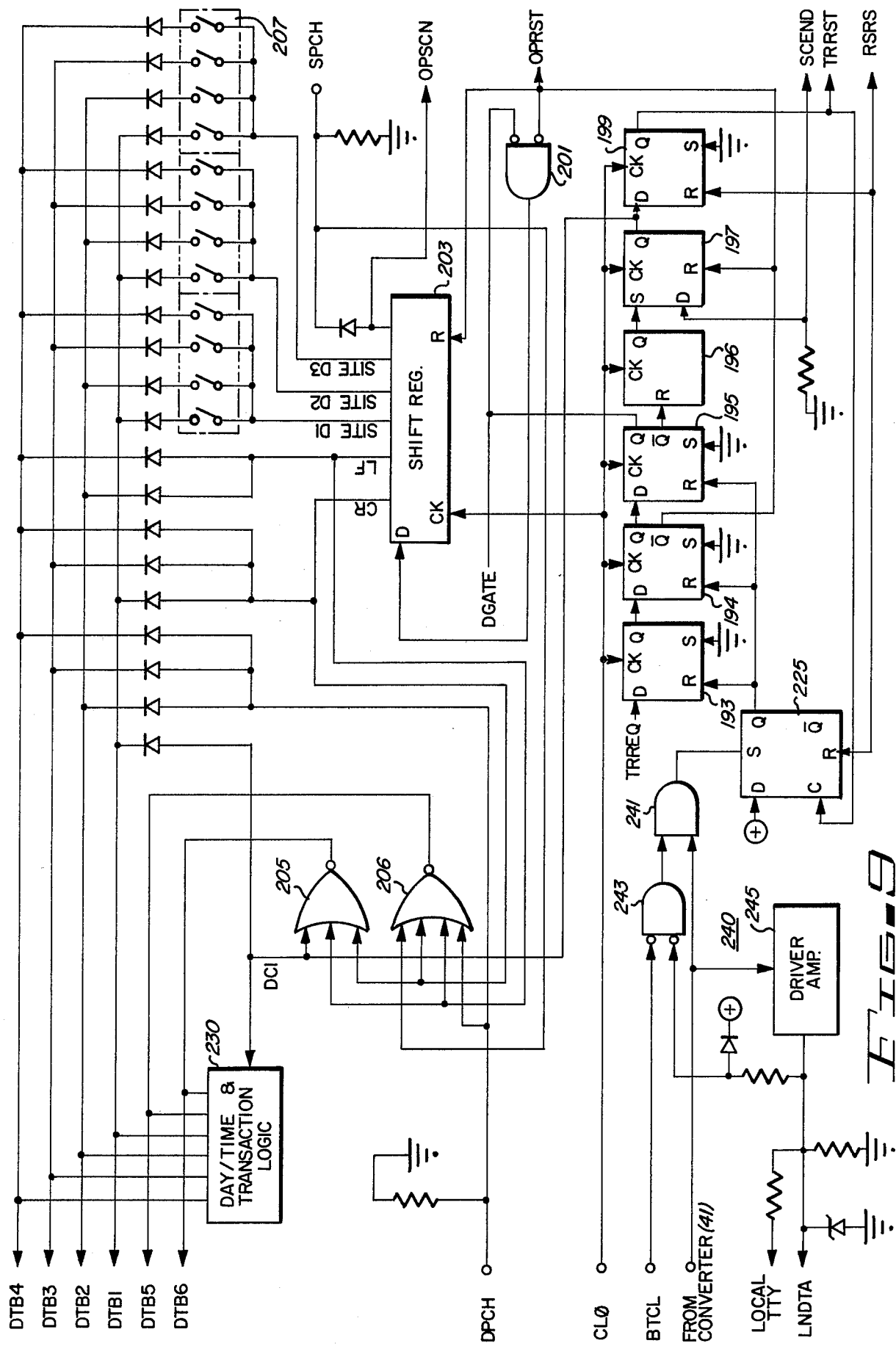

Turning back now to the circuit of FIG. 9, however, when the flip-flop 194 is set to its condition with a Q output high and a $\overline{Q}$ output low under control of the CL0 clock pulses applied to the circuit, both inputs to the negative logic NAND gate 201 go low since the flip-flop 195 remains in its reset condition until the application of the next CL0 clock pulse. As a consequence, the output of the NAND gate 201 goes high to produce an input signal to the D input of the shift register so that the first stage of the shift register is provided with this signal, resulting in the generation of a carriage return (CR) character which constitutes the first character in the header of a typical transaction message such as shown in FIG. 2. The encoding for this character from the first output of the shift register 203 is readily apparent to produce a binary "1" for bit locations B1, B3 and B4. This first output of the shift register also is applied to one of three inputs of a positive-logic NOR gate 205 to cause the normally high bit 6 (B6) and bit 5 (B5) outputs of the NOR gates 205 and 206 to go low (binary "0") for the generation of the carriage return character.

The next CL9 clock pulse causes a change of state in the flip-flop 195 and removes the high output from the gate 201, so that no further data is entered into the shift register 203. Thus, the binary "1" shifted into the shift register by the previous operation of the gate 201 continues to be shifted stage-by-stage sequentially through the register 203 in a normal manner in response to the CL0 clock pulses. The second step generates a line feed (LF) character in a manner similar to the generation of the CR character, forcing the outputs of both NOR gates 205 and 206 to go low, causing bits B5 and B6 to be binary "0" in the standard ASCII code. Continued clock pulses applied to the shift register 203 result in the generation of the next three digits for the site number which is set by a block of switches 207 to identify the particular site at which the transaction takes place. Once the switches 207 are set to identify the site at which the system is used, they remain unchanged.

When the count in the shift register 203 reaches the last stage, the generation of a space character SPCH is accomplished by supplying the output to the input of the NOR gate 206, forcing its output to go low (B5 binary "0"). At the same time, no positive inputs are supplied to the NOR gate 205 so that the bit 6 output goes high, designating a binary "1" for bit 6. It should also be noted that during the time that the site numbers are generated, all of the inputs to both NOR gates 205 and 206 are low so that binary "1's" are generated in bit levels 5 and 6 for all of the numerical digits of the header message.

The output of the final stage of the shift register 203 also constitutes the OPSCN input to the AND gate 149 (FIG. 5) to produce the data entry start scan input SCNST1 to a 17-stage shift register 210 (FIG. 7) associated with the dispenser from which the transaction now is being read out. Previously, the shift register 210 was reset to clear it by the OPRST output previously described. The next CL0 clock pulse which occurs then enters the binary "1" present on the SCNST1 input of the shift register 17 to produce a positive output from the first stage of the shift register. From an examination of FIG. 7, it can be seen that this input causes the first row of data in the RAM memory 160 to be read out and applied to the eight inputs of a switch gate 212 which functions as a four-pole, double-throw switch to alternately interconnect first the upper four inputs with its four outputs and then the lower four inputs with its four outputs under control of the outputs of the shift register 210.

Whenever an output is present from the shift register 210, it enables the upper group of inputs to the gate 212 when the output is connected to "A" input of the switch gate and the lower group whenever the shift register output 210 which is present is connected to the "B" control input of the switch gate 212. From an examination of FIG. 7, it can be seen that each row of the memory 160 is read twice as the shift register 17 progressively shifts its output from one stage to the next-succeeding stage. For example, outputs from stages 1 and 2 of the shift register 210 both are connected to the first row of the RAM memory 160. It should be noted, however, that the output of stage 1 energizes input A of the switch gate 212 while the output of stage 2 of the shift register 210 enables or energizes the control input B of the switch 212. Thus, when stage 1 is controlling the reading of the RAM memory 160, the upper four inputs, comprising one of the two digits of information stored in that row in the memory, are passed through the switch gate 212. When the second stage of the shift register is controlling the reading from the memory 160, the second digit, present on the lower four inputs to the switch gate 212, is supplied to the data output terminals.

The data output terminals shown to the right of the gate 212 are connected in common with the data output terminals for the first four data bits B1 – B4 of the circuit shown in FIG. 9 to the inputs to the parallel-to-series converter circuit 41 which converts the parallel information supplied by the header scanner of FIG. 9 and the circuit of FIG. 7 to serial data applied to the teletypewriter and memory circuit 32. It should be noted that during the entire time that data is being supplied by the switch gate 212, the outputs of both of the NOR gates 205 and 206 of FIG. 9 are high, so that bits 5 and 6 also are transferred as binary "1's" to the corresponding inputs of the converter circuit 41 to produce properly encoded digital information corresponding to the numbers read out from the memory 160.

Within the box representing the shift register 210, each of the outputs are numbered in the sequence in which they occur. It can be seen that after the first four outputs, sampling the first two columns of the RAM memory 160, have been produced, an output 5 is supplied through the SPCH lead (connected in common with the similarly labeled lead in FIG. 9) to generate a space character SP in the same manner described previously for the generation of this character from the last stage of the shift register 203. Then the output stages 6, 7, 8 and 9 of the shift register 210 are used to generate the next four digits of the transaction message which correspond with the vehicle identity previously stored in the RAM memory 160 from the credit card which initiated the transaction. Following the generation of the digits for the vehicle identity, another space character SP is generated.

The next six stages (11 through 16) of the shift register 210 then effect a readout of the RAM memory 161, storing the odometer number entry, in a manner similar to that described for the RAM memory 160. Once the odometer reading has been transferred through the switch gate 212 and through the converter 41 of FIG. 4, a final space character is generated when output 17 of the shift register 210 is reached.

This same output also generates a scan 2 signal SCNST2 which is supplied to the readout scan shift register 205 associated with the fuel type and quantity logic circuit of FIG. 8. The presence of the SCNST2 signal effects the setting in of a binary "1" into the readout scan shift register 205 in a manner similar to that previously described for the operation of the shift registers 203 and 210. The clock pulses CL0 also are used to effect a character-by-character readout of the information relative to product type and quantity from the circuit of FIG. 8 in a manner comparable to that described above for generation of the other portions of the transaction message. The first output from the readout scan shift register 205 enables the gate 185 to supply the information relative to product identity to the first four data bit terminals shown at the lower right-hand corner of FIG. 8. As stated previously, these terminals are connected in common with similarly labeled terminals to the first four data bit inputs of the parallel-to-series converter circuit 41 of FIG. 4. At the same time, the outputs of the NOR gates 205 and 206 of FIG. 9 continue to be high when this information is transferred; so that bits 5 and 6 are represented as binary "1's" in the portion of the message constituting the product identity as shown in FIG. 2.

The second output of the scanner circuit 205 generates a space character SPCH in the manner described previously. A pair of switch gates 220 and 221 which are similar in operation to the switch gate 212 of FIG. 7 are then employed to read out the four digits of fuel quantity representative of the transaction in response to the operation of the continued character-by-character stepping of the readout scan shift register circuit 205. The two highest order digits of the fuel quantity are read out of the product counter 190 by the switch gate 220, followed by the next highest order digit of fuel quantity read out by the switch gate 221. The next pulse out of the readout scan circuit 205 then generates a decimal point character DPCH by applying a pulse to the DPCH input shown in FIG. 9 to cause the generation of the appropriate permutation of bits on the data bit output leads DTB1 through DTB6. If this decimal point option is used, the vertical dotted-line wiring connections shown just below the readout scan circuit 205 are employed. If no decimal point is to be generated, such as for bulk terminal systems, the diagonal-line wiring is employed, and the vertical dotted-line connections are not used.

When the circuit 205 reaches its seventh output, the last digit of the fuel quantity is supplied from the switch gate 221 to the appropriate output terminals. This output also results in a positive signal being applied to a scan end output terminal SCEND. This signal is applied to the D input of the flip-flop 198 (FIG. 9) to cause its Q output to be set high up on the application of the next CL0 clock pulse. This results in the generation of a DC1 character as shown by the connections from this output to the input of the NOR gate 205 and to the DTB1 data bit terminal. When the output of the flip-flop 198 goes high, it enables the D input of the flip-flop 199 and the next CL0 clock pulse produces a high output from the flip-flop 199 which is the TRRST reset signal applied through the AND gate 148 (FIG. 5) to reset the transaction request latch circuit 115 to its original state, thereby producing a low output on the lead 142. The fuel dispenser from which the transaction was obtained then is ready to commence a new transaction in response to the insertion of a credit card and selection of that dispenser terminal.

Simultaneously, a reset control flip-flop 225 is cleared to produce a high output on its Q output, which resets the flip-flops 193 through 195 directly. When the flip-flop 194 is reset, it, in turn, produces a reset pulse to the flip-flop 198. Once per character interval (as determined by the time required to cycle through the clock outputs CL1 through CL0 to the beginning of a new cycle of those same outputs), an output RSRS also is obtained from the timer counter circuit 39. This output is applied to the reset inputs of the flip-flop 199 and 225 to cause the Q outputs of both of these flip-flops then to go low. Normally, this RSRS pulse has no effect on the operation of the circuit and only comes into play to reset these two flip-flops after the flip-flop 199 has been operated as described previously.

At the time that the output of the flip-flop 198 goes high, a day/time-and-transaction logic circuit 230, which is similar in operation to the operation of the header scanner circuit shown in FIG. 9, is enabled to complete the day, time, and transaction number portion of the transaction message shown in FIG. 2. This is effected under control of the CL0 clock pulses and a message generator circuit similar to those which have been described for generating the portions of the message already described in detail. The circuit 230 is an optional circuit and need not be used in all of the systems, if the information provided by the logic circuit 230 is not desired.

Once the transaction request TRREQ signal is removed, the transaction scanner circuit 47 once again is enabled to continue its cyclical scanning of all of the dispenser logic circuits until a new transaction request TRREQ is reached for one of these circuits. The foregoing cycle of operation then is repeated to produce the new transaction message and forward it to the teletypewriter and memory circuit 32.

The foregoing description of the system operation is sufficient for a single controller terminal to produce messages for forwarding to a teletypewriter and memory circuit 32 used only by that terminal. However, it often is desirable for more than one control terminal to be employed in a single fuel-dispensing station or to couple together, for reasons of economy, more than one station having control terminals with a single teletypewriter and memory system 32. When this is done, it is possible for more than one of the controller systems to be attempting to transmit data to the teletypewriter and memory circuits 32 simultaneously. Obviously, the data transmitted from different terminals would be different; so that if this occurs, it is sensed by a line contention circuit 240 (shown in the lower left-hand corner of FIG. 9).

The circuit 240 operates in conjunction with the flip-flop 225 to reset the transaction request flip-flops 193 through 195, timer 196, and flip-flops 198 and 199 in the manner described previously if data already appears on the line which does not correspond to the locally transmitted data. The signals from the local converter 41 are applied to one input of a positive logic AND gate 241. The other input to this AND gate is obtained from a negative logic AND gate 243 which is clocked at the bit clock rate. The local converter output is supplied through a line driver amplifier 245 of conventional type, the output of which then is supplied to the local teletypewriter 32 or on the line to a shared teletypewriter and memory terminal 32, or both. So long as the output signals appearing at the output on the line from the driver 245 are the same as those applied to its input and to the gate 241 from the converter 41, no output is obtained from the gate 241. Any time, however, a binary "0" appears on the line at the same time that a binary "1" is supplied from the converter 41, an output is obtained from the gate 241 to set the flip-flop 225 to produce a high output on its Q output terminal. This resets the local system which will continually attempt to re-initiate a transaction request since the TRREQ signal remains high. Thus, the system will continuously be reset until it gains control of the line, at which time the normal operating sequence for generating the transaction data described above takes place.

It should be noted that in the foregoing description, various positive logic and negative logic coincidence gates have been described to perform different functions in the circuit operation. It should be understood that the particular gate designations which have been used are merely for the purpose of convenience and that the logic systems and gate arrangements obviously could be varied to suit particular operating conditions for a comparable system. In addition, different types of specific circuit arrangements could be used to effect the temporary storage and transaction message generation if desired. It is to be understood that the specific embodiment of the system which has been described above is not to be considered limiting but merely as illustrative of a preferred implementation of the system concept.

I claim:

1. A document-controlled automatic dispensing system for controlling the dispensing of products from a plurality of dispensers, including in combination:

document reading means for reading data from a document inserted therein to control the dispensing system;

means for selecting a particular one of said plurality of dispensers from which products are to be dispensed in response to insertion of a document in said reading means;

validity check means coupled with said reading means for verifying the validity of documents inserted therein and further coupled with said dispensers for enabling said dispensers for the dispensing of products therefrom in response to a predetermined output from said validity check means indicative of a valid document;

first storing means uniquely associated with each of said plurality of dispensers and enabled by said selecting means for temporarily storing identifying data from a document inserted in said document reading means;

second storing means uniquely associated with each of said plurality of dispensers for temporarily storing data representative of the quantity of product dispensed therefrom;

switch means for each dispenser operated upon termination of the dispensing of product therefrom;

transaction recording means; and data transfer means coupled with said first and second data storing means and with said switch means and responsive to operation of said switch means for transferring said temporarily stored data from said first and second data storing means to said transaction recording means.

2. The combination according to claim 1 further including product identifying means for each dispenser and coupled with said validity check means upon selection of such dispenser for providing indicia representative of the product dispensed by said dispenser which is compared with data indicative of authorized product type read from said document reading means by said validity check means for enabling the selected dispenser for the dispensing of product therefrom upon verification by said validity check means that the document inserted in the document reading means may be used to withdraw the product dispensed from such selected dispenser.

3. The combination according to claim 1 wherein said first and second storing means comprise first and second RAM memories, respectively.

4. The combination according to claim 1 wherein said validity check means includes comparator means and resettable switch means coupled with said comparator means for providing predetermined combinations of data to said comparator means for comparison with corresponding data on documents inserted in said document reading means, so that a failure of a predetermined comparison of the data encoded on a document inserted in the document reading means with the data established by the settings of said resettable switch means prevents said validity check means from producing said predetermined output, thereby preventing the selected dispenser from being enabled to dispense product.

5. The combination according to claim 1 wherein said data transfer means further includes means for generating and transferring data indicative of the date and time of said transaction and data uniquely identifying the particular transaction to said transaction recording means along with said data from said first and second storing means.

6. The combination according to claim 1 wherein said validity check means comprises comparator means for comparing preset validity characters with corresponding characters on the document inserted into said document reading means, and a parity check circuit means for verifying the predetermined parity of the data encoded on the document inserted into said document reading means.

7. The combination according to claim 1 wherein said document reading means and said validity check means are common to said plurality of dispensers, and said identifying data is transferred to said first storing means for the selected dispenser and is stored in said first storing means during the time that said selected dispenser is dispensing product, so that said document reading means and said validity check means may thereafter be used for reading and checking data from a different document to permit selection of a different one of said plurality of dispensers even though said first-mentioned dispenser continues to be enabled for dispensing product therefrom.

8. The combination according to claim 7 further including scanning means for continuously, sequentially scanning each of said switch means for said plurality of dispensers and coupled with said data transfer means to effect transfer of data from said first and second storing means for a dispenser having an operated switch means; and means coupling said switch means with said scanning means for suspending operation of said scanning means during the time said data transfer means is operative to transfer data to said transaction recording means.

* * * * *